Oct. 22, 1968      J. J. BROWN, JR      3,407,325
FLUORESCENT MANGANESE ACTIVATED MAGNESIUM
GALLATE PHOSPHOR AND LAMP
Filed Sept. 28, 1965
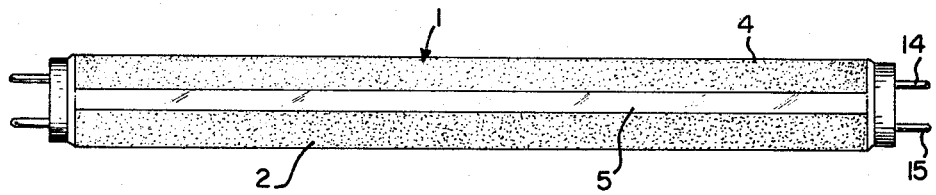
FIG. 1
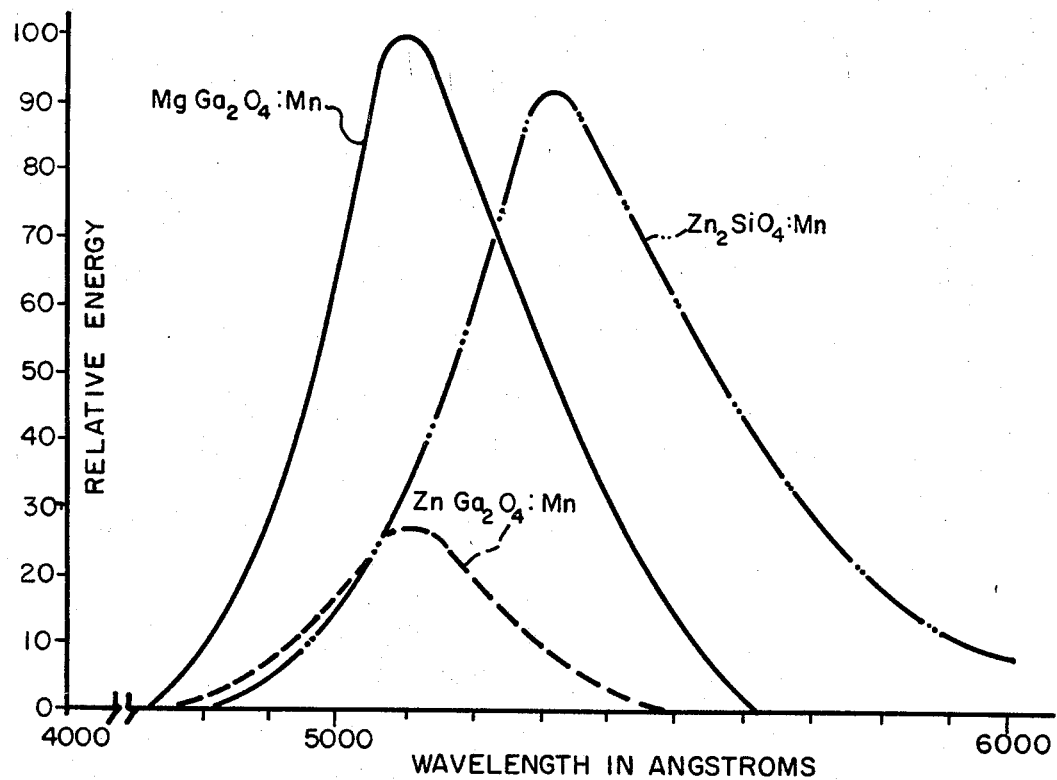
FIG. 2
JESSE J. BROWN, JR
INVENTOR.
BY 
ATTORNEY

United States Patent Office 3,407,325
Patented Oct. 22, 1968

3,407,325
FLUORESCENT MANGANESE ACTIVATED MAGNESIUM GALLATE PHOSPHOR AND LAMP
Jesse J. Brown, Jr., Towanda, Pa., assignor to Sylvania Electric Products Inc., a corporation of Delaware
Continuation-in-part of application Ser. No. 467,898, June 29, 1965. This application Sept. 28, 1965, Ser. No. 490,931
7 Claims. (Cl. 313—109)

ABSTRACT OF THE DISCLOSURE

A fluorescent phosphor emitting in the green region when excited by ultraviolet light. The phosphor is magnesium gallate activated by manganese.

---

This application is a continuation-in-part of my copending application, Ser. No. 467,898, filed June 29, 1965, now abandoned.

This invention relates to phosphors which can be excited by ultraviolet light and particularly to a magnesium gallate phosphor activated by manganese. Such phosphors have been found to emit a narrow band of visible light near 5100 A. when excited by 2537 A. ultraviolet radiation which makes them particularly applicable to xerographic reproduction techniques.

Certain gallate-type phosphors have previously been disclosed to the art, however, their emission has not been sufficient or of the proper wavelength so that they could be used in xerographic reproduction equipment.

Accordingly, the primary objective of my invention is to prepare a phosphor which when excited by 2537 A. radiation, efficiently emits light in a relatively narrow region of the visible spectrum at 5120 A.

A feature of my invention is the activation of magnesium gallate by manganese and its application in fluorescent lamps and high pressure electric discharge devices.

The many other features, objects and advantages will become manifest to those conversant with the art upon reading the following specification when taken in conjunction with the accompanying drawings.

Of these drawings:

FIGURE 1 is a perspective view of an aperture-type fluorescent lamp utilizing the magnesium gallate phosphor according to my invention.

FIGURE 2 compares the emission spectrum of my magnesium gallate phosphor activated by manganese with those of the conventionally used zinc orthosilicate phosphor and a zinc gallate phosphor activated by manganese.

Referring now to FIGURE 1, the lamp 1 has a sealed, hollow, glass tube 2 containing a filling of 85% argon and 15% helium (although other suitable gas fillings may be used). On the inside surface of the glass envelope there is a coating 4 of the magnesium gallate phosphor. The phosphor coating 4 is shown to extend around about 315° of the circumference of the tube; the other 45°, aperture 5 of the tube left free of phosphor coating to allow light from the phosphor to emerge therethrough.

The width of the aperture utilized in the lamp is determined by the amount of light which is desired. Thus, sizes other than the 45° above noted may be utilized, such as between 20° and 90°. The brightness in the aperture area increases as the aperture width is reduced.

At each end of the glass tube 1 there is an electrode comprising an oxide-coated tungsten coil, two auxiliary anodes and associated lead-in wires as shown for example, in a United States Patent No. 2,961,566 of John F. Waymouth et al. for a fluorescent lamp. A usual insulating plastic base with the base carrying contacts 14 and 15, can be as shown, for example, in United States Patent No. 2,896,187, issued July 21, 1959 to R. B. Thomas and E. C. Shappell, for a lamp base, or some suitable base can be used.

The phosphor coating may be applied at first over the entire glass envelope by methods well known in the art, and then scraped and brushed off from the aperture 5 of the glass tube 2, as desired.

Referring now to FIGURE 2, the emission spectral energy distribution of the magnesium gallate phosphor activated by manganese is compared with those of the conventionally used zinc orthosilicate phosphor and a zinc gallate phosphor activated by manganese. The spectral distribution curve for manganese activated magnesium gallate is normalized to 100 with the relative peak intensities of the other two luminophors reduced proportionately.

For the present xerographic reproduction process, it is most desirable to have a phosphor which has a narrow peak emission in the 5000 to 5300 A. region because the characteristics of the copying devices are such that the best copies are made in that area.

As is seen from the figure, the magnesium gallate phosphor has a relatively sharper emission of narrower half width than the conventionally used zinc orthosilicate. Moreover the relative peak height of the magnesium gallate is greater than that of the zinc orthosilicate. Each is brighter, of course, than the zinc gallate.

I have discovered that the magnesium gallate phosphor according to my invention can have the following formula: $Mg_xGa_2O_4$:$Mn_y$ wherein $y$ can be varied between about 0.001 to 0.05 and the total of $x+y$ can be varied between about 0.75 to 1.05. When greater than the upper limits or less than the lower limits are used, the phosphor will not fluoresce appreciably and the emission will be shifted somewhat. Comparing lamps prepared using magnesium gallate phosphor to those using zinc orthosilicate, I have discovered that my magnesium gallate phosphor produced 13,188 ft. lamberts at 0 hours, 12,336 ft. lamberts at 96 hours for a maintenance of 94% and 10,916 ft. lamberts at 216 hours for a maintenance of 83% whereas a conventional zinc orthosilicate phosphor had a 100 hour maintenance of only 86% and a 200 hour maintenance of 83%.

The luminescent material may be prepared by solid state reaction of magnesium carbonate and gallium oxide with the addition of the manganese activator in the form of manganese carbonate or any other well-known manganese salt. After blending, the mixture is fired between 1000° C. and 1400° C. from 5 to 20 hours. Although a weak luminescence is developed at this point, a second firing in a mildly reactive atmosphere (e.g., 0.01 to 1% $H_2$ in $N_2$) is necessary to develop an efficient phosphor. This second heat treatment may vary from 1000 to 1400° C. and be as short as 30 minutes. The resulting mixture has the spinel-type crystal structure.

Illustrative of procedures for preparing phosphors according to this invention, the following example is cited. This example is cited to show a preferred method of preparing the magnesium gallate phosphor and is not intended to be limitative upon the claims.

EXAMPLE I

The following ingredients are combined in the dry state:

7.256 gm. $MgCO_3$
0.115 gm. $MnCO_3$
18.744 gm. $Ga_2O_3$

This is essentially equivalent to 0.854 mole MgO, 1.0 mole $Ga_2O_3$, and 0.01 mole MnO. The above mixture is blended and heat-treated in air in an open Vycor crucible at 1400° C. for 17 hours, crushed, and refired at 1200° C. for 1 hour in an $N_2$–0.01% $H_2$ atmosphere. The sample is allowed to cool to room temperature in the mildly reducing atmosphere with air being carefully excluded. The reacted product has essentially the matrix composition of $MgO \cdot Ga_2O_3$ wherein 0.01 mole of the magnesium has been replaced by manganese.

It is apparent that modifications may be made within the spirit and scope of the instant invention, but it is my intention however to be only limited to the following claims.

As my invenion I claim:

1. A fluorescent phosphor consisting essentially of magnesium gallate activated by manganese in sufficient quantities to produce luminescence.

2. A fluorescent phosphor consisting essentially of magnesium gallate activated by manganese, wherein the manganese content is between about 0.001 to 0.05 gram atom per mole of gallate.

3. A fluorescent phosphor consisting essentially of $Mg_xGa_2O_4:Mn_y$ wherein $y$ is between about 0.001 and 0.05 and the sum of $x$ and $y$ is between about 0.75 and 1.05.

4. An electrical discharge device comprising: a pair of electrodes; a glass envelope disposed about said electrode; a fill of mercury disposed within said device and a coating of a fluorescent material consisting essentially of magnesium gallate activated by manganese in sufficient quantities to produce luminescence, disposed upon the internal surface of said envelope.

5. An electrical discharge device comprising: a pair of electrodes; a glass envelope disposed about said electrodes; a fill of mercury disposed within said device and a coating of a fluorescent material disposed upon the internal surface of said envelope, said material consisting essentially of magnesium gallate activated by manganese, said manganese content being between about 0.001 and 0.05 gram atom per mole of gallate.

6. The device according to claim 5 wherein the total content of manganese and magnesium is between about 0.80 and 0.95 gram atom per mole of gallate.

7. The device according to claim 6 wherein the phosphor is coated only part way around the glass envelope thereby leaving a clear glass slit for light to emerge therethrough.

References Cited

UNITED STATES PATENTS

| 3,275,872 | 9/1966 | Chernin et al. | 313—109 |
| 3,282,856 | 11/1966 | Borchardt | 252—301.4 |

OTHER REFERENCES

Kroger: Some Aspect of the Luminescence of Solids, 1948, pp. 99, 296, 294, and 295..

TOBIAS E. LEVOW, *Primary Examiner.*

R. D. EDMONDS, *Assistant Examiner.*